US009684143B2

(12) United States Patent
Chen et al.

(10) Patent No.: US 9,684,143 B2
(45) Date of Patent: Jun. 20, 2017

(54) RELEASABLE CONNECTION INTERFACE FOR A FIBER OPTIC COMPONENT HOLDER

(71) Applicant: COMMSCOPE TECHNOLOGIES LLC, Hickory, NC (US)

(72) Inventors: Chien-An Chen, Holly Springs, NC (US); Barry Wayne Allen, Siler City, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/960,738

(22) Filed: Dec. 7, 2015

(65) Prior Publication Data

US 2016/0161695 A1    Jun. 9, 2016

Related U.S. Application Data

(60) Provisional application No. 62/089,556, filed on Dec. 9, 2014.

(51) Int. Cl.
*G02B 6/44* (2006.01)
(52) U.S. Cl.
CPC .......... *G02B 6/4454* (2013.01); *G02B 6/4471* (2013.01)
(58) Field of Classification Search
CPC .. G02B 6/4452; G02B 6/4455; G02B 6/4453; G02B 6/4454; G02B 6/4477
See application file for complete search history.

(56) References Cited

U.S. PATENT DOCUMENTS 4,697,874 A * 10/1987 Nozick ................ G02B 6/4452
                                                                         385/134
5,142,606 A *  8/1992 Carney ................ G02B 6/4452
                                                                         385/134
(Continued)

FOREIGN PATENT DOCUMENTS

JP          9-251117          9/1997
JP       2004-212839          7/2004
(Continued)

OTHER PUBLICATIONS

International Search Report and Written Opinion for Application No. PCT/US2015/064245 mailed Mar. 18, 2016.
(Continued)

*Primary Examiner* — Thomas A Hollweg
*Assistant Examiner* — Mary A El Shammaa
(74) *Attorney, Agent, or Firm* — Merchant & Gould P.C.

(57) ABSTRACT

A fiber management tray is described including a releasable connection interface. The tray can include a base defining at least one component mounting location having a structure for mounting optical components. The structure may define a first side and an opposite second side. The structure may also define a first retention opening and a second retention opening that extend through the structure from the first side to the second side. The first retention opening can include a T-shaped slot having a first portion and a second portion. The first portion of the T-shaped slot may have a larger cross-dimension than a cross-dimension of the second portion of the T-shaped slot. The second retention opening may have a first portion in which a flexible cantilever is positioned and a second portion. The second portion of the second retention opening may have a smaller cross-dimension than a cross-dimension of the first portion of the second retention opening. The flexible cantilever can include a
(Continued)

release member that projects outwardly in a first direction from the first side of the structure.

16 Claims, 7 Drawing Sheets

(56) References Cited

U.S. PATENT DOCUMENTS

| | | | | |
|---|---|---|---|---|
| 5,689,605 A * | 11/1997 | Cobb | ................... | G02B 6/4454 |
| | | | | 385/135 |
| 5,907,653 A * | 5/1999 | Burek | ................... | G02B 6/3801 |
| | | | | 385/135 |
| 7,502,542 B2 | 3/2009 | Fujisawa et al. | | |
| 2006/0215980 A1* | 9/2006 | Bayazit | ................ | G02B 6/4454 |
| | | | | 385/135 |
| 2014/0126872 A1* | 5/2014 | Naudin | ................ | G02B 6/4455 |
| | | | | 385/135 |
| 2014/0205254 A1* | 7/2014 | Rudenick | ............... | G02B 6/444 |
| | | | | 385/135 |
| 2014/0219614 A1* | 8/2014 | Marcouiller | ......... | G02B 6/3817 |
| | | | | 385/88 |
| 2014/0219615 A1* | 8/2014 | Petersen | .............. | G02B 6/3825 |
| | | | | 385/88 |
| 2015/0241654 A1* | 8/2015 | Allen | ................... | G02B 6/4454 |
| | | | | 385/135 |

FOREIGN PATENT DOCUMENTS

| | | |
|---|---|---|
| JP | 2005-157102 | 6/2005 |
| JP | 2005-202380 | 7/2005 |

OTHER PUBLICATIONS

FIST-SOSA (Splice Only Sub Assembly) Installation Instruction, TE Connectivity, 8 pages (Jan. 1999).
Universal optical component holder Installation Instruction, Tyco Electronics, 2 pages (Oct. 2010).

* cited by examiner

RELEASABLE CONNECTION INTERFACE FOR A FIBER OPTIC COMPONENT HOLDER

CROSS REFERENCE TO RELATED APPLICATIONS

This application claims the benefit of provisional application Ser. No. 62/089,556, filed Dec. 9, 2014, which is incorporated herein by reference in its entirety.

TECHNICAL FIELD

The present disclosure relates generally to fiber optic systems and devices. More particularly, the present disclosure relates to devices and systems for mounting fiber optic components to fiber management trays or other structures.

BACKGROUND

Optical fiber distribution systems may include equipment such as fiber management trays that are mounted in telecommunications closures or at other locations. A typical fiber management tray includes fiber routing paths for allowing excess length of optical fiber to be stored in looped configurations without violating minimum bend radius requirements for the optical fiber. Fiber optic components such as fiber optic fusion splice holders, passive optical splitters and wavelength division multiplexers are also often mounted to fiber management trays. Improved structures are needed for connecting and releasing fiber optic components to and from structures such as fiber management trays.

SUMMARY

Teachings of the present disclosure relate to a connection interface that can allow for simple and reliable connecting and releasing of optical components. Certain aspects of the present disclosure relate to a snap-fit connection interface that allows an optical component to be effectively connected and released from a mating structure while requiring access to only one side (e.g., a front side) of the mating structure. In certain examples, the mating structure can include a fiber management tray and the optical component can include a splice holder or a holder housing component such as a passive optical splitter or a wavelength division multiplexer.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
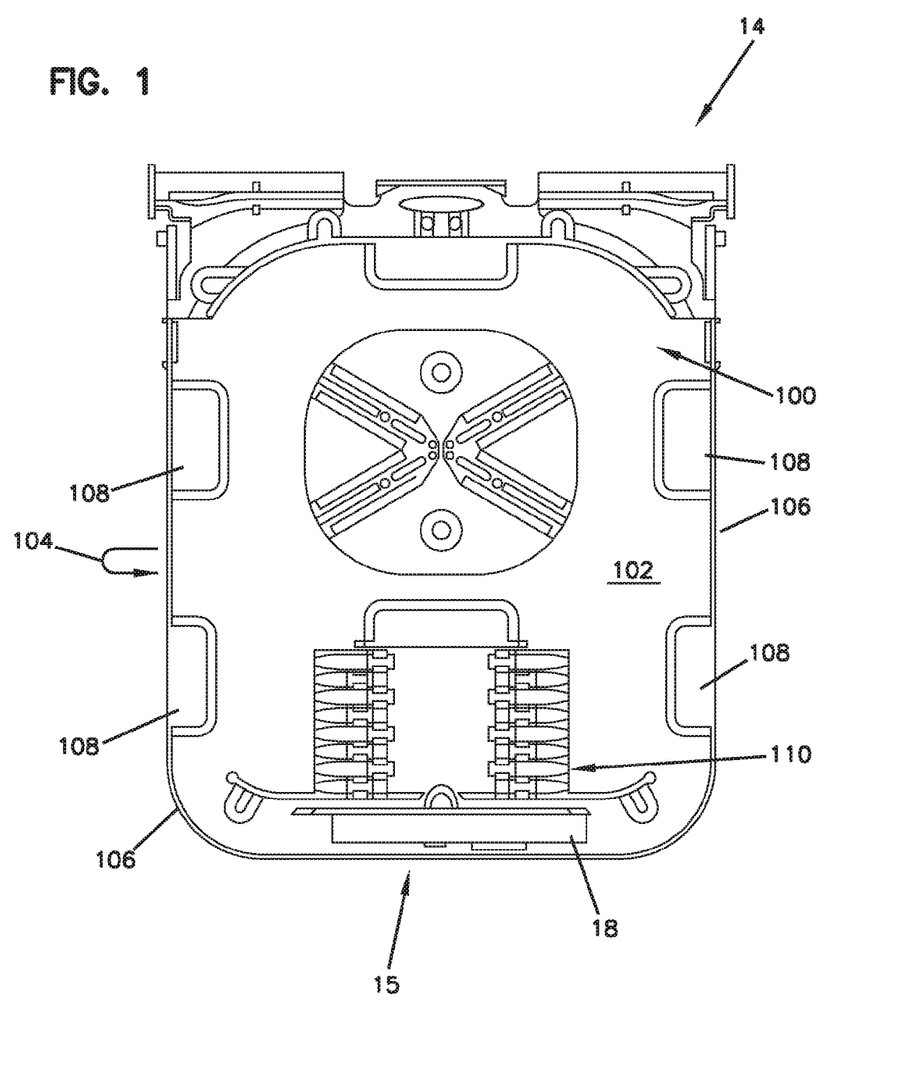
FIG. 1 illustrates a tray incorporating a component mounting location in accordance with the principles of the present disclosure, components such as a passive optical splitter or a wavelength division multi-plexer is shown mounted at the component mounting location.
Figure 2:
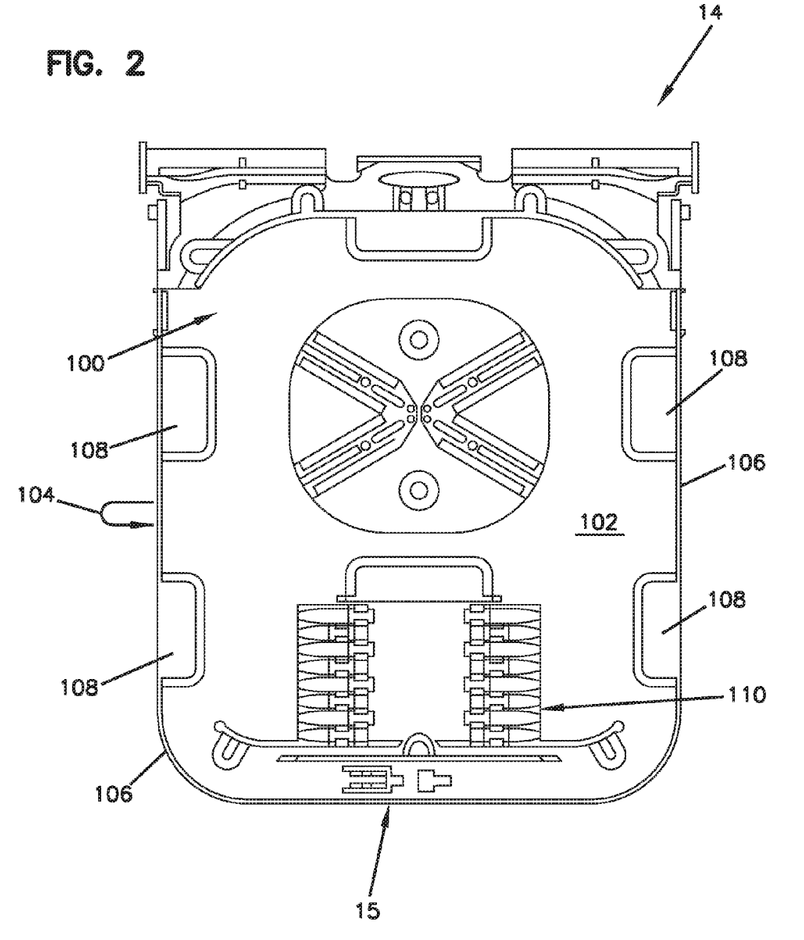
FIG. 2 shows the tray of FIG. 1 with the component removed.

FIGS. 1 and 2 illustrate a fiber management tray 14 (e.g., a splice tray) including a component mounting location 15 in accordance with the principles of the present disclosure. As shown at FIG. 1, an optical component 18 (e.g., a passive optical splitter, a wavelength division multiplexer, or other component) is secured at the component mounting location 15. A connection interface in accordance with the principles of the present disclosure is used to secure the optical component 18 at the component mounting location 15. In certain examples, the component connection interface is releasable so as to allow the optical component 18 to be interlocked at the component mounting location 15 and to be released from the component mounting location from the front side of the fiber management tray 14. Thus, it is not necessary to access the back side of the fiber management tray 14 to release the optical component 18 from the fiber management tray 14. This is advantageous in situations where obtaining access to the back side of the fiber management tray 14 can be difficult. For example, the fiber management tray 14 may have a fixed mounting configuration or space constraints and fiber routing may make it difficult to access the back side of the fiber management tray 14.

It will be appreciated that in certain examples, fiber management trays in accordance with the principles of the present disclosure can have fixed mounts. In other examples, fiber management trays in accordance with the principles of the present disclosure may have pivotal mounts and may be part of a stack of pivotal fiber management trays. In certain examples, fiber management trays in accordance with the principles of the present disclosure may be incorporated into housings, enclosures, cabinets, panels, or other structures.

As depicted herein, one example of a connection interface in accordance with the present disclosure is shown integrated into a fiber management tray. In other examples, connection interfaces in accordance with the principles of the present disclosure can be integrated into other structures such as shelves, cabinets, panels, enclosures, or other structures where it may be desirable to releasably mount fiber optic components such as fiber optic power splitters and fiber optic wavelength division multiplexers.

Referring to FIGS. 1 and 2, the fiber management tray 14 includes a main body 100 having a front side 102 and a back side 104. The fiber management tray 14 also includes a side wall 106 that extends around the perimeter of the main body 100. The main body 100 and the side wall 106 can cooperate to define a recessed region in which optical fibers can be managed. In certain examples, various fiber routing paths (e.g., loops) can be defined at the front side 102 of the fiber management tray 14. In certain examples, fibers can be looped about the perimeter of the main body 100 along the side wall 106. In certain examples, tabs 108 can be provided for retaining optical fibers routed on the front side 102 of the fiber management tray 14. In certain examples, the fiber management tray 14 can also include a splice mounting location 110 for mounting optical splices made between optical fibers routed on the fiber management tray 14. In certain examples, an input fiber can be spliced to an input side of the optical component 18. In certain examples, output fibers from the optical component 18 can also be routed on the fiber management tray 14.

Figure 3:
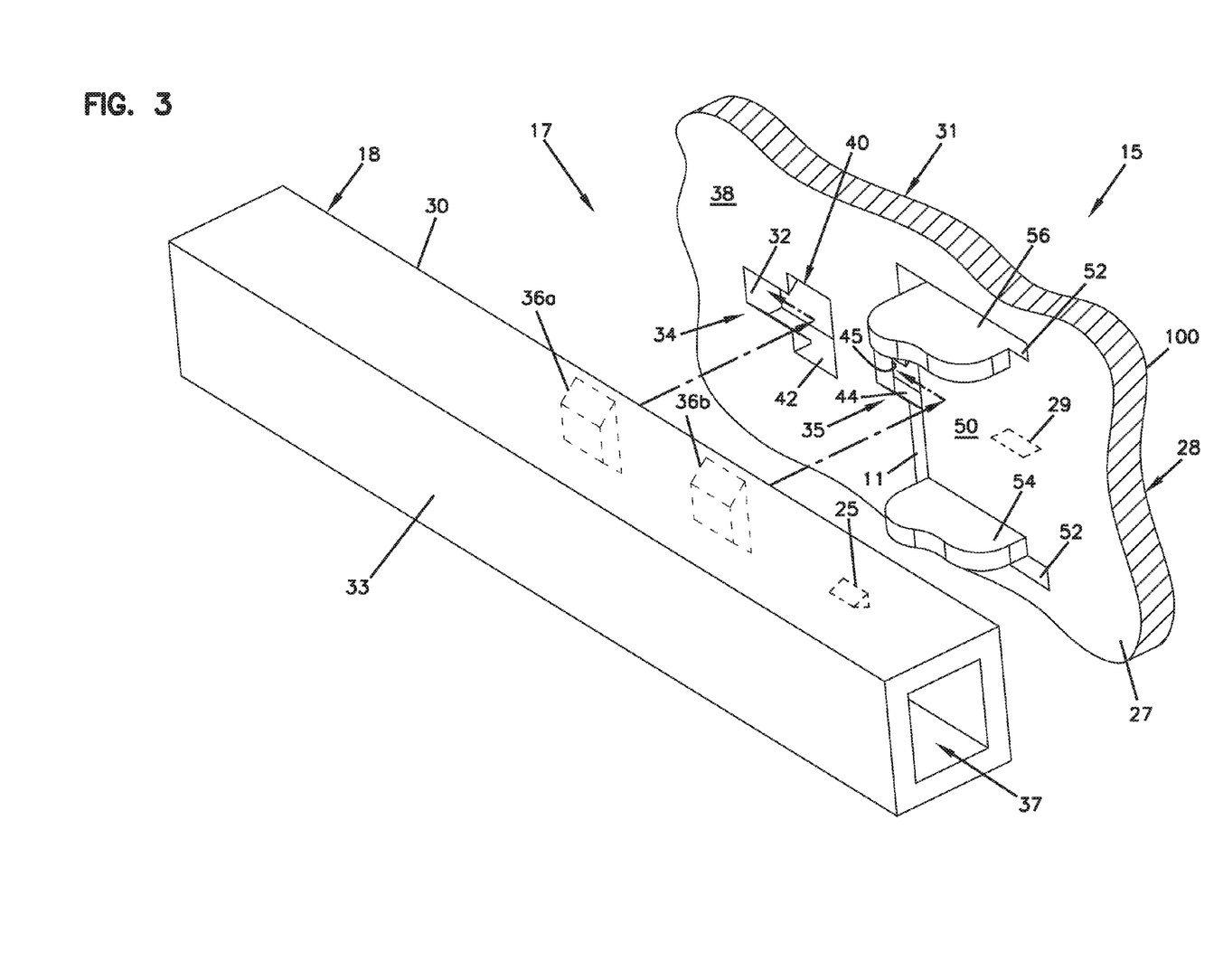
FIG. 3 is a top perspective view of an example component connection interface in accordance with the present disclosure, in one example the connection interface is between an optical component and a mounting location at a fiber management tray such as a splice tray.
Figure 4:
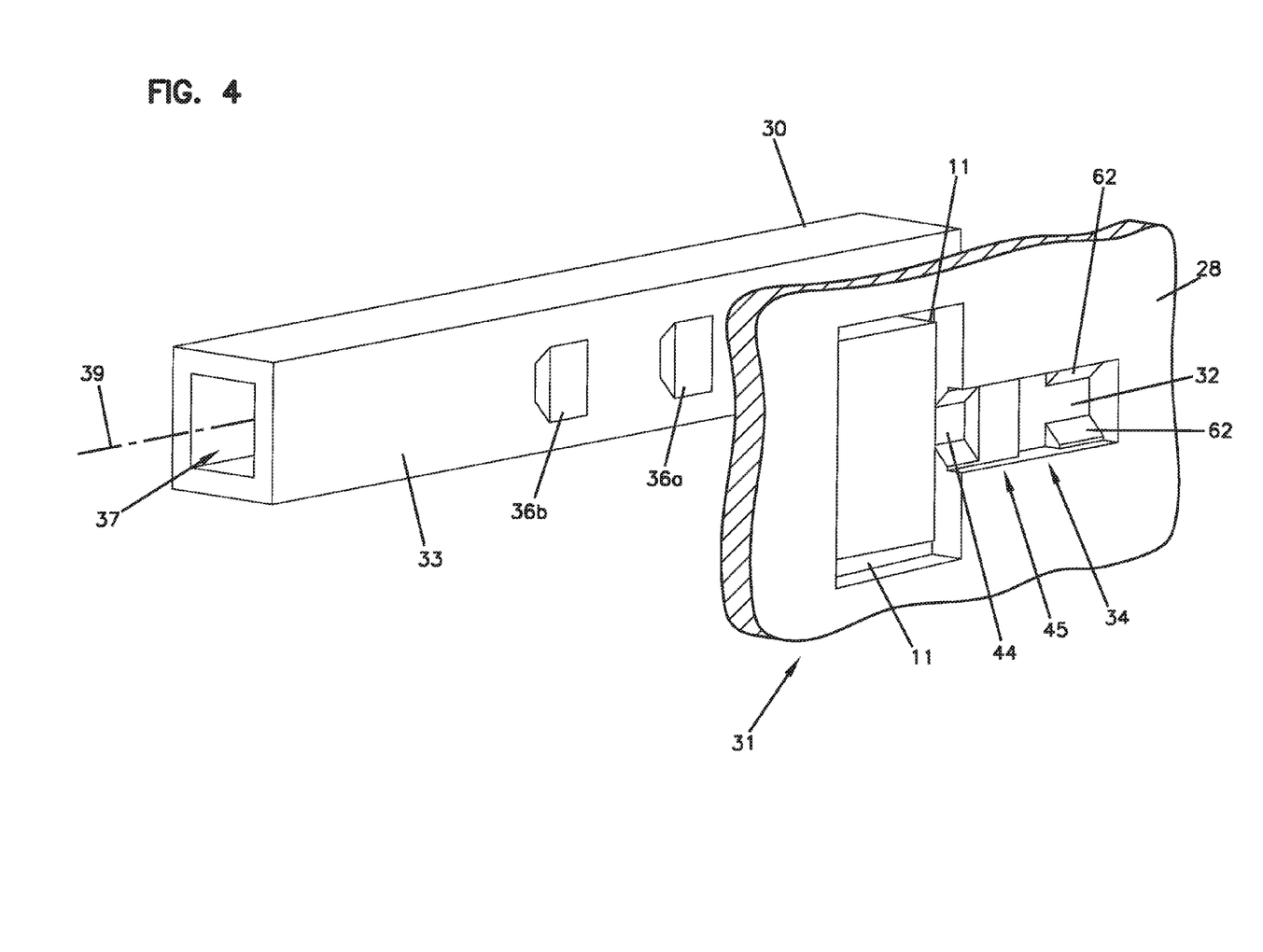
FIG. 4 is a bottom perspective view the component connection interface of FIG. 3.

FIGS. 3 and 4 illustrate an example of a releasable component connection interface 17 in accordance with the principle of the present disclosure. In certain examples the releasable connection interface 17 can be defined between the component mounting location 15 of the fiber management tray 14 and the optical component 18.

Figure 12:
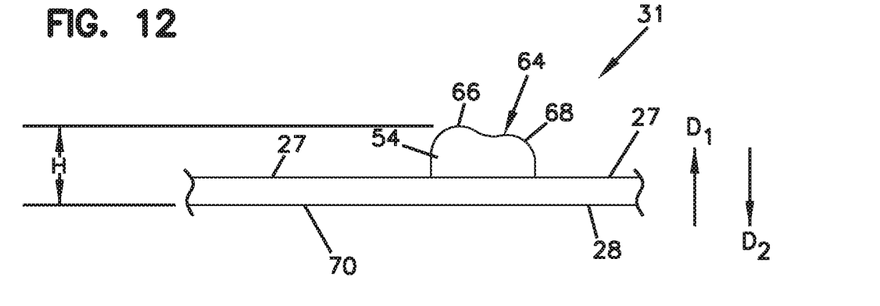
FIG. 12 is a side view of the component mounting location of the tray of FIG. 1.
Figure 13:
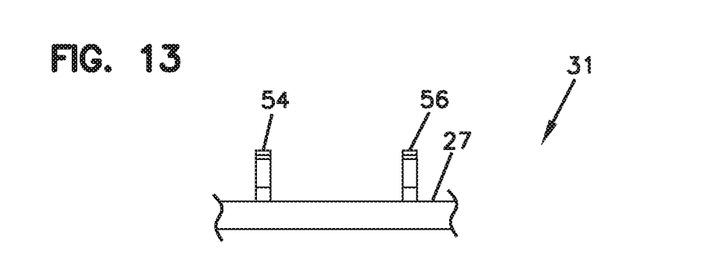
FIG. 13 is an end view of the component mounting location of the tray of FIG. 1.

The component mounting location 15 can include a first retention opening 34 and a second retention opening 35 that extend through a structure 31 such as the main body 100 of the fiber management tray 14 from a front side 27 to a back side 28. The first retention opening 34 can include a T-shaped slot 40 having a first portion 42 and a second portion 32. In the depicted example, first portion 42 of the T-shaped slot 40 can have a larger cross-dimension than a cross-dimension of the second portion 32 of the T-shaped slot 40. The second retention opening 35 can have a first portion 44 in which a flexible cantilever 50 can be positioned and a second portion 45. In one example, the second portion 45 of the second retention opening 35 can have a smaller cross-dimension than a cross-dimension of the first portion 44 of the second retention opening 35. In some examples, the flexible cantilever 50 can include release members 54, 56 that project outwardly in a first direction $D_1$ (see FIG. 12) from the front side 27 of the structure 31. In one example, the first direction $D_1$ is a forward direction. In other examples, the mounting location 15 can be provided at other structures such as walls of shelves, panels, housings, slidable trays, etc.

The optical component 18 can be attached to the front side 27 of the structure 31. The optical component 18 can include a protective holder 30 (e.g., a housing) that can be attached to the front side 27 of the structure 31. The protective holder 30 can include a main holder body 33 that is elongated along a holder body axis 39. The main holder body 33 can define a receptacle 37 for receiving a fiber optic device. In some examples, the fiber optic device can be positioned within the receptacle 37. The fiber optic device can be, for example, a splice, a passive optical power splitter, or a wavelength division multiplexer. The protective holder 30 can include first and second retention features 36a, 36b (e.g., contact elements) that project from the main holder body 33. The first and second retention features 36a, 36b being configured to respectively be received within the first and second retention openings 34, 35 of the structure 31.

Figure 6:
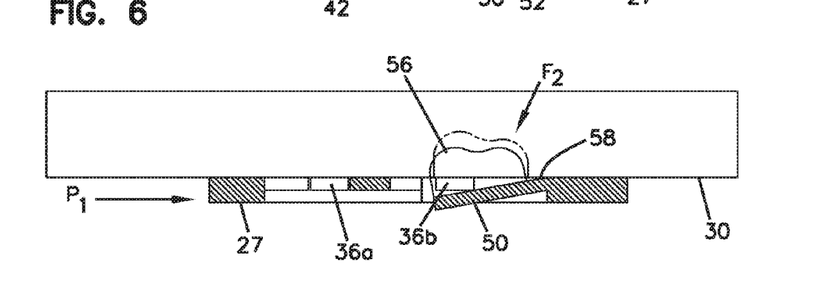
FIG. 6 is a partial cross-sectional view showing the connection interface in the process of being interlocked.
Figure 7:
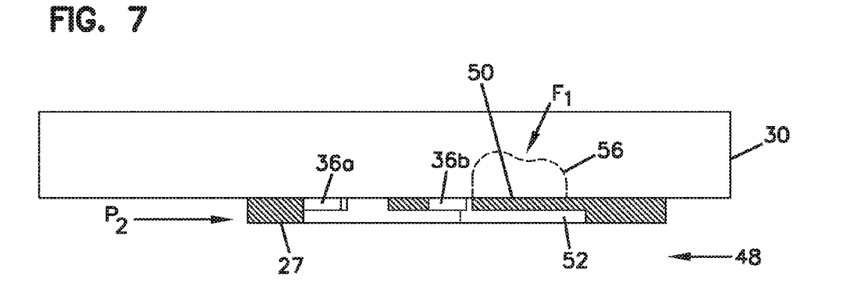
FIG. 7 is a partial cross-sectional view showing the connection interface interlocked.

Referring to FIGS. 6 and 7, the protective holder 30 is moveable relative to the structure 31 along an axial orientation defined by the holder body axis 39 between first and second first holder positions $P_1$, $P_2$. The first holder position $P_1$ is a receiving position as shown in FIG. 6. The second holder position $P_2$ is a locked position as shown in FIG. 7. In some examples, the axial orientation is perpendicular relative to the first direction $D_1$.

The first retention feature 36a can be configured to be positioned in the first portion 42 of the first retention opening 34 and the second retention feature 36b can be positioned within the first portion 44 of the second retention opening 35 when the protective holder 30 is in the first holder position $P_1$. The first retention feature 36a can be positioned in the second portion 32 of the first retention opening 34 and the second retention feature 36b being positioned within the second portion 45 of the second retention opening 35 when the protective holder 30 is in the second holder position $P_2$. The protective holder 30 may be removable from the structure 31 in the first direction $D_1$ when the protective holder 30 is in the first holder position $P_1$. The protective holder 30 may not be removable from the structure 31 in the first direction $D_1$ when the protective holder 30 is in the second holder position $P_2$. It should be noted that the first and second retention openings 34, 35 may be configured in a variety of different configurations as long as it allows the protective holder 30 or other device to be slidably and removably coupled to the structure 31.

The protective holder 30 can be mounted to the structure 31 irrespective to orientation. In other words, the protective holder 30 can be mounted in more ways than one to the structure 31 such that it is bidirectional. In certain examples, a keying mechanism may be adapted such that the protective holder 30 is mounted to the structure 31 in only one way. For example, the protective holder 30 can include a projection 25 (see FIG. 3) positioned on the main holder body 33 adjacent the first and second retention features 36a, 36b that can be configured to engage a slot 29 (see FIG. 3) defined in the structure 31. The projection 25 and slot 29 arrangement allows for the protective holder 30 to mount to the structure 31 in only one direction. If the protective holder 30 is rotated 180 degrees relative to the structure 31, the projection 25 would not engage the slot 29 thereby making it unidirectional. Thus, if it is desired to have a unidirectional holder, one can use the protective holder 30 including the projection 25 and the structure 31 including the slot 29. If it is desired to have a bidirectional device, one can use the protective holder 30 without the projection 25 and the structure 31 without the slot 29. It will be appreciated that other keying mechanisms may be used for obtaining unidirectional orientation of the protective holder 30 relative to the structure 31 when mounted.

Alternatively, a keying mechanism may be provided by configuring the first retention feature 36a with a different size than and second retention feature 36b such that the protective holder 30 mounts in only one way to the structure 31.

Figure 5:
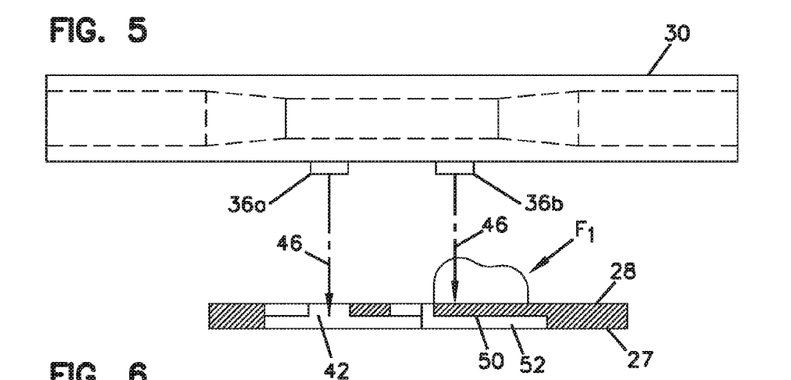
FIG. 5 is a partial cross-sectional view of the connection interface just prior to engagement.
Figure 8:
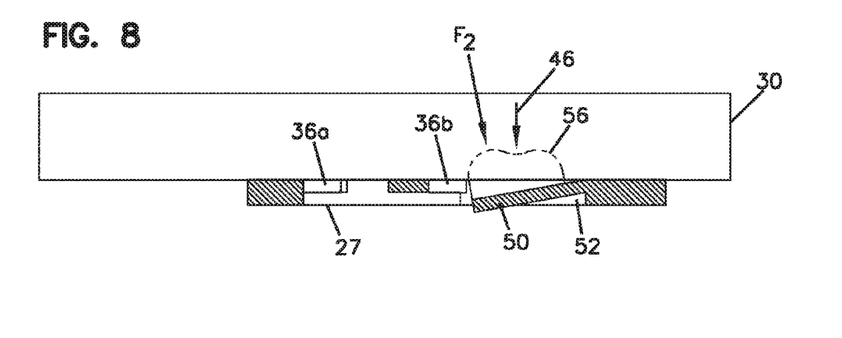
FIG. 8 is a partial cross-sectional view showing the connection interface in the process of being disengaged.

In certain examples, the flexible cantilever 50 may be movable between a non-flexed position $F_1$ (see FIGS. 5 and 7) and a flexed position $F_2$ (see FIGS. 6 and 8). The flexible cantilever 50 can move in a second direction $D_2$ (see FIG. 12) opposite from the first direction $D_1$ when moving from the non-flexed position $F_1$ to the flexed position $F_2$ The second direction $D_2$ can be a rearward direction. The flexible cantilever 50 can be configured to prevent the fiber optic component holder 30 from being moved from the second holder position $P_2$ to the first holder position $P_1$ when in the non-flexed position $F_1$ The flexible cantilever 50 can be configured to allow the fiber optic component holder 30 to be moved from the second holder position $P_2$ to the first holder position $P_1$ when in the flexed position $F_2$.

In certain examples, the release members 54, 56 can be configured to be manually pressed from the front side 27 of the structure 31 to cause the flexible cantilever 50 to be manually moved from the non-flexed position $F_1$ to the flexed position $F_2$ while the protective holder 30 is in the second holder position $P_2$ thereby allowing the protective holder 30 to be moved from the second holder position $P_2$ to the first holder position $P_1$ and then released from the structure 31. The flexible cantilever 50 is flexed such that the protective holder 30 can be slid along its axis from the second holder position $P_2$ to the first holder position $P_1$ without interference from the flexible cantilever 50. The release members 54, 56 allow the operator to manually flex the flexible cantilever 50 from the non-flexed position $F_1$ to the flexed position $F_2$ entirely from the front side 27 of the structure 31. Thus, it is not necessary to access the back side 28 of the structure 31 to release the protective holder 30 from the mounting location 15. In one example, the protective holder 30 can be mounted between the release members 54, 56 when in the first and second holder positions $P_1$, $P_2$.

In some examples, the first and second retention features 36a, 36b have profiles that mechanically interfere with the structure 31 when the protective holder 30 is in the second holder position $P_2$ such that the protective holder 30 is prevented from being removed from the structure 31 in the first direction $D_1$. In one example, the first and second retention features 36a, 36b can have dovetail cross-sectional profiles that mate with corresponding dovetail cross-section profiles defined by the second portions 32, 45 of the first and second retention openings 34, 35. The flexible cantilever 50 can be defined by cutouts 52 that form a recess 11 in the second retention opening 35. The flexible cantilever 50 can be hingedly mounted at hinge 58 for pivotal movement of the flexible cantilever 50.

In one example, a protective holder 30 (e.g., fiber optic element) can be mounted on the component mounting location 15 of the tray 14 by a snap-fit interlock, for example. The fiber management tray 14 and the protective holder 30 may be formed of a molded plastic material and the flexible cantilever 50 may resiliently snap to from the flexed position $F_2$ to the non-flexed position $F_1$ when the protective holder 30 is slid along its axis from the first position $P_1$ to the second position $P_2$.

In the depicted example, the front side 27 is configured with a single mounting location 15. It will be appreciated that multiple mounting location 15 may be provided. The mounting locations 15 can be arranged in rows. It should be noted that the structure 31 may be used for mounting a variety of different components on the fiber management trays 14, such as radius limiters, cable fixation clamps, other fiber optic equipment, etc.

With the items as described above, assembly and operation will now be discussed in further detail. With respect first to FIGS. 3-5, the protective holder 30 is oriented for engagement with the mounting location 15. For example, the protective holder 30 is oriented between the release members 54, 56 with the first retention feature 36a aligned above the enlarged portion 42 of the first retention opening 34 and the second retention feature 36b aligned above the free end of the flexible cantilever 50. To initiate the interlock process, the protective holder 30 is moved in the second direction $D_2$ such that the first retention feature 36a moves into the enlarged portion 42 of the first retention opening 34 and the second retention feature 36b moves into the second retention opening 35. As the second retention feature 36b moves into the second retention opening 35, the second retention feature 36b contacts a front side of the flexible cantilever 50 adjacent its free end causing the flexible cantilever 50 to flex from the non-flexed position $F_1$ to the flexed position $F_2$. Once the first and second retention features 36a, 36b are received within the first portions 42, 44 as described above, the protective holder 30 can be moved along the axial orientation from the first position $P_1$ to the second position $P_2$. When the protective holder 30 reaches the second position $P_2$, the second retention feature 36b moves past the free end of the flexible cantilever 50 thereby allowing the flexible cantilever 50 to snap from the flexed position $F_2$ to the non-flexed position $F_1$. In the non-flexed position $F_1$, the free end of the flexible cantilever 50 opposes the second retention member 36b thereby blocking axial movement of the protective holder 30 in a direction toward the flexible cantilever 50 thereby capturing the second retention member 36b in the narrow second portion 45 of the second retention opening 35. The protective holder 30 can be mounted between the release members 54, 56. Dovetail configurations provided by retaining wedges 62 (see FIG. 4) formed in the second portion 32 of the first retention opening 34 and the second portion 45 prevent the protective holder 30 from being forwardly removed from the first and second retention openings 34, 35 when the protective holder 30 is in the second position $P_2$.

To disengage the protective holder 30, the release members 54, 56 can be depressed so that the flexible cantilever 50 no longer prevents axial movement of the flexible holder 30 from the second position $P_2$ to the first position $P_2$. The flexible holder 30 is then slid to first position $P_1$ and pulled away from the mounting location 15 in the first direction $D_1$ to de-couple the flexible holder 30 from the structure 31. It should be appreciated that this assembly provides for an ergonomic design, where a user may place an index finger over the release members 54, 56 to depress the flexible cantilever 50 for release. The user can replace or remove parts from the front side 27 of the fiber management tray 14 needing access to the back side 28 of the fiber management tray 14.

It should be noted that a snap-fit interlock utilizing dovetail profiles and a flexible cantilever lock is only one example of an attachment mechanism that may be used to mount a component at the component mounting location 15 and that other types of attachment mechanisms or methods (that limit axial pull on a secured cable) may be used.

Figure 9:
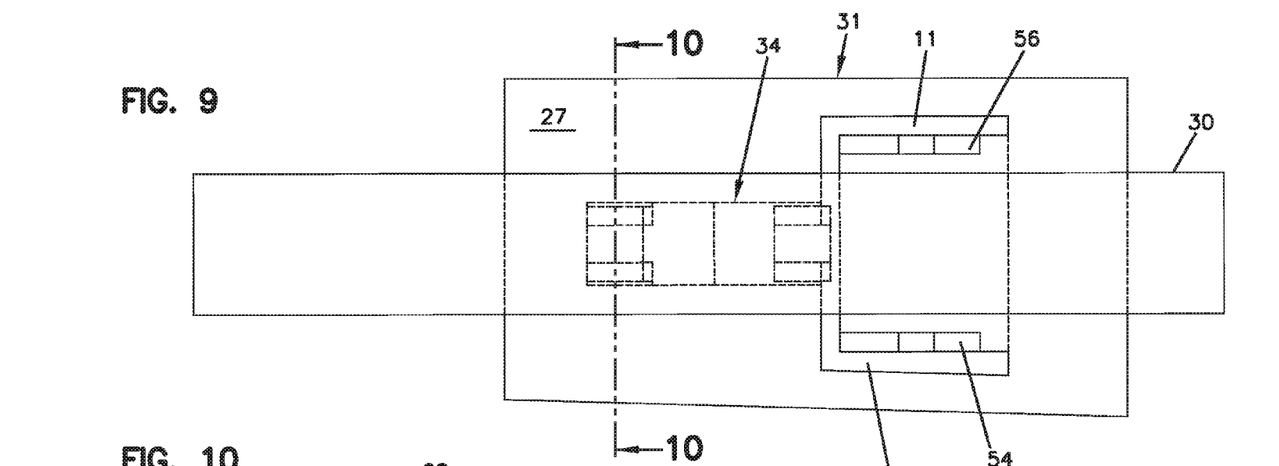
FIG. 9 is a top, plan view showing the connection interface interlocked.
Figure 10:
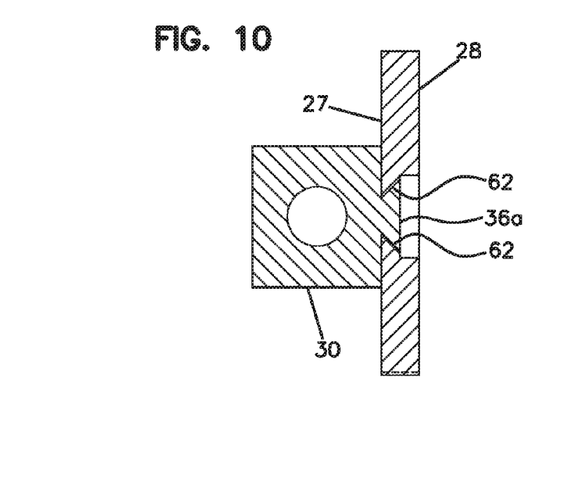
FIG. 10 is a cross-section view taken along line 10-10 of FIG. 9.
Figure 11:
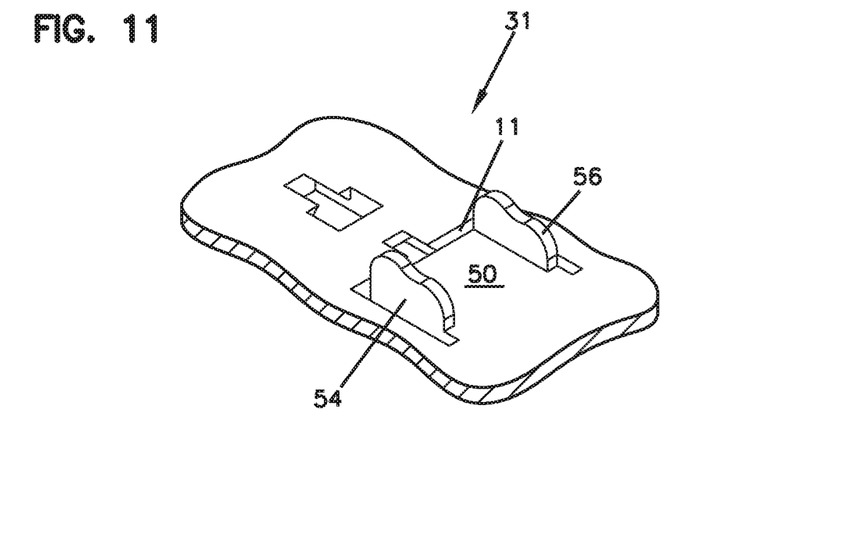
FIG. 11 is a perspective view of the component mounting location of the tray of FIG. 1.

Referring to FIGS. 9 and 10, a top and cross-sectional view of the protective holder 30 in the fully locked position is shown. As depicted, the first and second retention features 36a, 36b can be held in the fully locked position or retaining position by retaining wedges 62 provided in the structure 31. The retaining wedges 62 can be arranged and configured on opposite sides of the first and second retention features 36a, 36b.

In certain examples, the release members 54, 56 can define a top surface 64, at least a portion of which is configured in generally a S-shape to include peak surfaces 66, 68. It will be appreciated that the shape and/or configuration of the release members 54, 56 may vary in other examples. A height H of the peak surface 66 projects forwardly from the front surface of the structure 31. In some examples, the height measured from a base 70 of the structure 31 can be about 0.22 inches. A height H is taller than a corresponding height of the protective holder 30. In other examples, the height H is shorter than a corresponding height of the protective holder 30.

From the forgoing detailed description, it will be evident that modifications and variations can be made without departing from the spirit and scope of the disclosure.

What is claimed is:

1. An arrangement including a releasable connection interface, the arrangement comprising:
    a structure defining a first side and an opposite second side, the structure also defining a first retention opening and a second retention opening that extend through the structure from the first side to the second side, the first retention opening including a T-shaped slot having a first portion and a second portion, the first portion of the T-shaped slot having a larger cross-dimension than a cross-dimension of the second portion of the T-shaped slot, the second retention opening having a first portion in which a flexible cantilever is positioned and a second portion, the second portion of the second retention opening having a smaller cross-dimension than a cross-dimension of the first portion of the second retention opening, the flexible cantilever including a release member that projects outwardly in a first direction from the first side of the structure; and
    a protective holder that attaches to the first side of the structure, the protective holder including a main holder body that is elongated along a holder body axis, the main holder body defining a receptacle for receiving a fiber optic component, the protective holder including first and second retention features that project from the main holder body, the first and second retention features being configured to be respectively received within the first and second retention openings, the protective holder being moveable relative to the structure along an axial orientation defined by the holder body axis between first and second first holder positions, the axial orientation being perpendicular relative to the first direction, the first retention feature being positioned in the first portion of the first retention opening and the second retention feature being positioned within the first portion of the second retention opening when the fiber optic component holder is in the first holder position, the first retention feature being positioned in the second portion of the first retention opening and the second retention feature being positioned within the second portion of the second retention opening when the fiber optic component holder is in the first holder position, the protective holder being removable from the structure in the first direction when the protective holder is in the first holder position, and the protective holder not being removable from the structure in the first direction when the protective holder is in the second holder position; and
    the flexible cantilever being movable between a non-flexed position and a flexed position, the flexible cantilever moving in a second direction opposite from the first direction when moving from the non-flexed position to the flexed position, the flexible cantilever being configured to prevent the protective holder from being moved from the second holder position to the first holder position when in the non-flexed position, the flexible cantilever being configured to allow the protective holder to be moved from the second holder position to the first holder position when in the flexed position, and the release member being configured to be manually pressed from the first side of the structure to cause the flexible cantilever to be manually moved from the non-flexed position to the flexed position while the protective holder is in the second holder position thereby allowing the protective holder to be moved from the second holder position to the first holder position and then released from the structure.

2. The arrangement of claim 1, wherein the structure includes a fiber management tray.

3. The arrangement of claim 1, wherein the fiber optic component is positioned within the receptacle of the protective holder, and wherein the fiber optic component is selected from the group consisting of a splice, a passive optical power splitter, and a wavelength division multiplexer.

4. The arrangement of claim 1, wherein the release member is one of two release members on the flexible cantilever, and wherein protective holder mounts between the release members when in the first and second holder positions.

5. The arrangement of claim 1, wherein the first and second retention features have profiles that mechanically interfere with the structure when the protective holder is in the second holder position such that the protective holder is prevented from being removed from the structure in the first direction.

6. The arrangement of claim 5, wherein the first and second retention features have dovetail cross-sectional profiles that mate with corresponding dovetail cross-section profiles defined by the second portions of the first and second openings.

7. The arrangement of claim 1, further comprising a keying mechanism for mounting the protective holder to the structure in only one way.

8. A fiber management tray including a releasable connection interface, the tray comprising:
    a base defining at least one component mounting location having a structure for mounting optical components, the structure defining a first side and an opposite second side, the structure also defining a first retention opening and a second retention opening that extend through the structure from the first side to the second side, the first retention opening including a T-shaped slot having a first portion and a second portion, the first portion of the T-shaped slot having a larger cross-dimension than a cross-dimension of the second portion of the T-shaped slot, the second retention opening having a first portion in which a flexible cantilever is positioned and a second portion, the second portion of the second retention opening having a smaller cross-dimension than a cross-dimension of the first portion of the second retention opening, the flexible cantilever including a release member that projects outwardly in a first direction from the first side of the structure.

9. The fiber management tray of claim 8, further comprising an optical component holder for holding an optical component, wherein the optical component holder attaches to the first side of the structure.

10. The fiber management tray of claim 9, wherein the optical component is selected from the group consisting of a splice, a passive optical power splitter, and a wavelength division multiplexer.

11. The fiber management tray of claim 8, wherein the tray is formed of a molded plastic material.

12. The fiber management tray of claim 8, wherein the release member is one of two release members on the flexible cantilever.

13. The fiber management tray of claim 9, wherein the release member is one of two release members on the flexible cantilever, and the optical component holder mounts between the release members.

14. The fiber management tray of claim 9, further comprising a keying mechanism for mounting the optical component holder to the structure in only one way.

15. The fiber management tray of claim 9, wherein the optical component holder includes first and second retention features that project from a main body, the first and second retention features being configured to be respectively received within the first and second retention openings of the structure.

16. The fiber management tray of claim 15, wherein the first and second retention features have dovetail cross-sectional profiles that mate with corresponding dovetail cross-section profiles defined by the second portions of the first and second retention openings.

\* \* \* \* \*